United States Patent [19]

Montreuil

[11] Patent Number: 5,321,318
[45] Date of Patent: Jun. 14, 1994

[54] STRAY CURRENT NEUTRALIZING METHOD AND DEVICE

[76] Inventor: Michel Montreuil, 13, rue Marie-Claude St-Charles-de-Bellechasse, Québec, Québec, Canada, G0R 2T0

[21] Appl. No.: 888,140
[22] Filed: May 26, 1992

[30] Foreign Application Priority Data

Feb. 5, 1992 [CA] Canada ............................. 2060673

[51] Int. Cl.⁵ ............................................. H02H 9/08
[52] U.S. Cl. ................................... 307/326; 361/42; 361/58; 307/327
[58] Field of Search ................. 361/42, 43, 58, 88, 361/111; 307/326, 327; 336/30, 199, 160

[56] References Cited

U.S. PATENT DOCUMENTS

| | | | |
|---|---|---|---|
| 989,596 | 4/1911 | Geppert. | |
| 1,010,907 | 12/1911 | Hayden. | |
| 2,483,397 | 10/1949 | Bonner. | |
| 3,383,520 | 5/1968 | Hoffman | 307/95 |
| 3,636,409 | 1/1972 | Stephens et al. | |
| 3,725,669 | 4/1973 | Tatum | 307/95 |
| 3,769,926 | 11/1973 | Race. | |
| 3,870,925 | 3/1975 | Huey et al. | |
| 4,091,291 | 5/1978 | Foster et al. | 307/95 |
| 4,398,188 | 8/1983 | Feigal et al. | |
| 4,401,055 | 8/1983 | Street et al. | |
| 4,776,847 | 8/1988 | Venczel et al. | 119/29 |
| 4,816,956 | 3/1989 | Hertz et al. | 361/42 |
| 5,121,711 | 6/1992 | Aine | 119/29 |

FOREIGN PATENT DOCUMENTS 1174195 9/1984 Canada.
1230374 12/1987 Canada.
2008156 1/1991 Canada.

*Primary Examiner*—Jeffrey A. Gaffin

[57] ABSTRACT

A method and device neutralize alternating stray current flowing through a ground return circuit in the proximity of an animal susceptible to be affected by this current. The alternating stray current flowing through the ground return circuit is sensed and a signal representative of that stray current is produced. In response to this current representative signal, an alternating compensatory current is generated and injected in the ground return circuit. The alternating compensatory current has an amplitude equal to the amplitude of the sensed stray current and is out of phase with respect to that stray current by an angle of 180°. Therefore, the alternating compensatory current and the alternating stray current add in the ground return circuit and substantially cancel each other whereby the stray current can no longer affect the animal. A plurality of different configurations for the connection of the stray current neutralizing device to the ground return circuit are described, each configuration being adapted to a specific application.

19 Claims, 5 Drawing Sheets

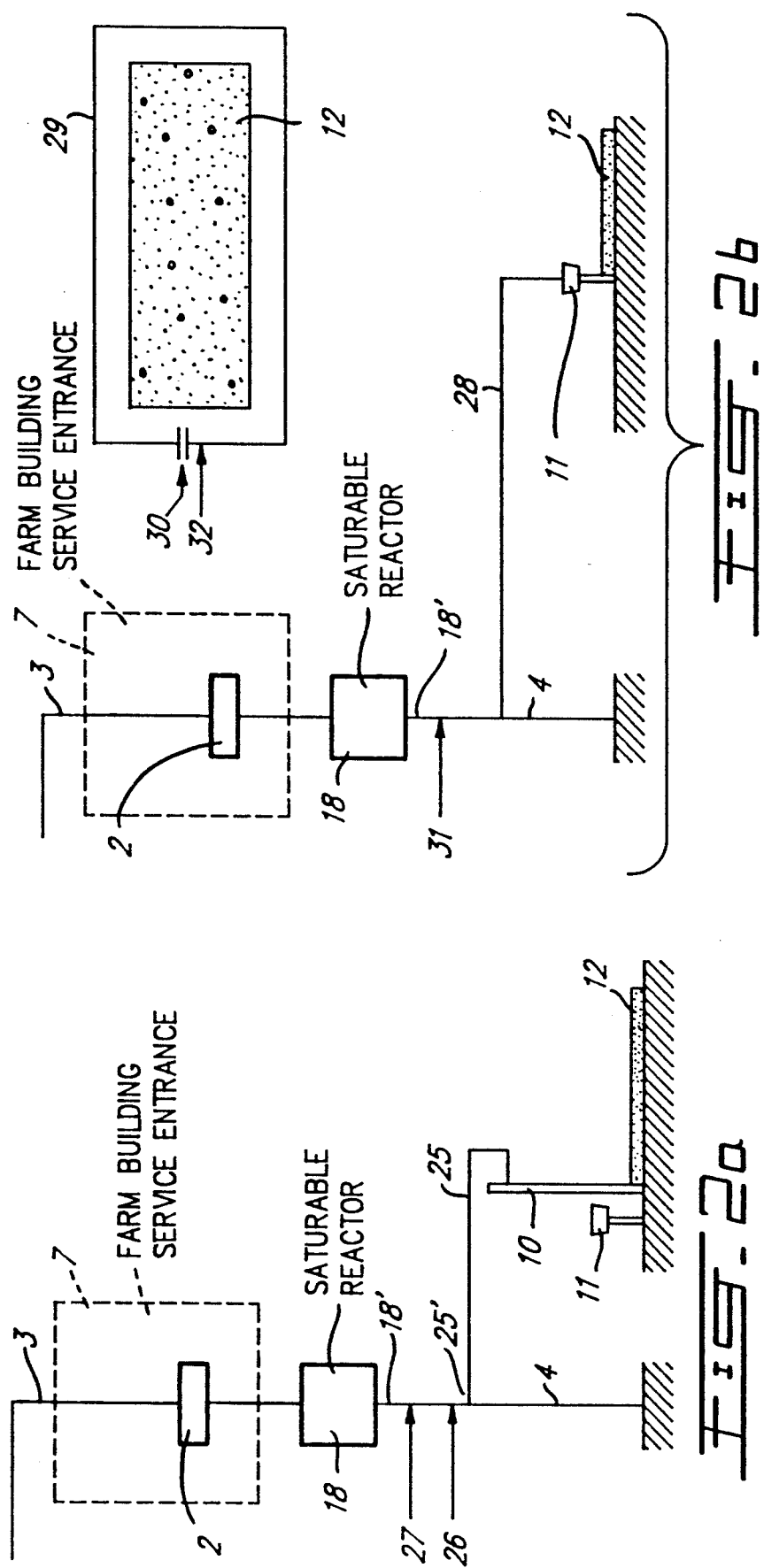

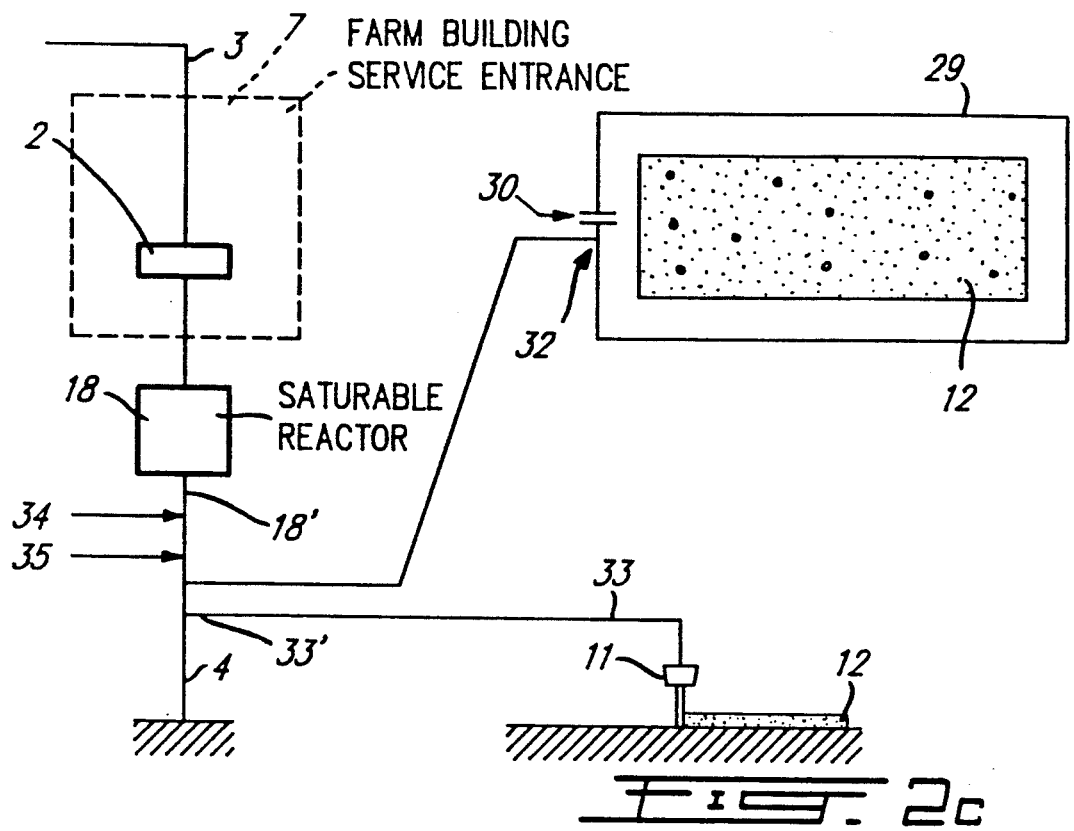
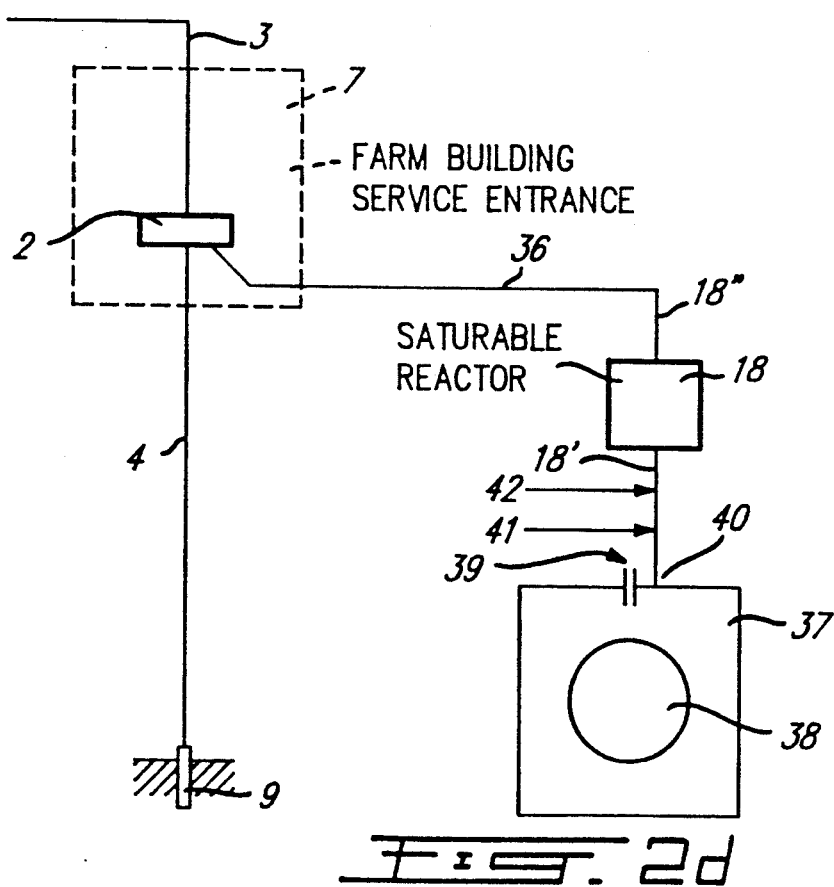

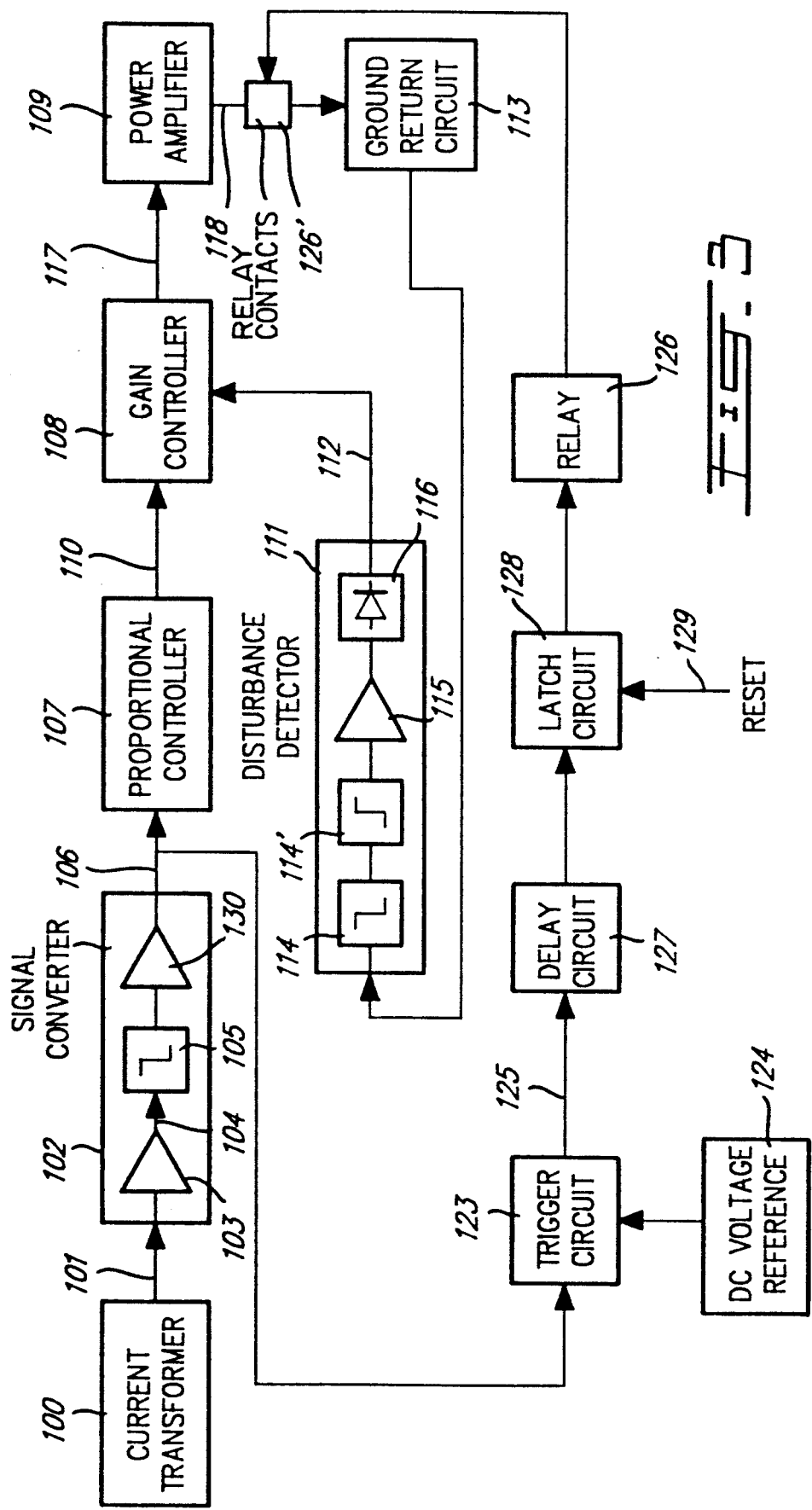

STRAY CURRENT NEUTRALIZING METHOD AND DEVICE

FIELD OF THE INVENTION

The present invention relates to a stray current neutralizing method and device capable of neutralizing a particular phenomenon of the tingle voltages, that is the bypass currents that can greatly affect the health of a livestock.

BACKGROUND OF THE INVENTION

When stray current from the concrete floor of a farm building flows through the body of an animal to reach the metallic structures of that farm building and their grounding connection network, the animal(s) feels this stray current. The animal(s) is affected and has a physiological reaction resulting into abnormal health conditions.

As an example, the physiological reaction of a man when an electric current flows through his body (hand-trunk-foot) can be summarized as follows:

perception threshold: 1—3 mA (duration of 1 sec);

strong sensation threshold: 3.5–8 mA (duration of 1 sec);

contraction and release threshold: 8–15 mA (duration of 1 sec);

fibrillation current threshold: 30 mA and more (duration of 1 sec).

The symptoms specific to each species can be seen when stray current is flowing.

For example, cows will refuse to give their milk and to enter in the cowshed. They may also paw the ground and kick the milker. In the most critical situations, the cows present problems of mastitis, of reproduction, of leucocyte, etc.

Pigs can present similar symptoms; cases of cannibalism and mastitis, and problems of diarrhoea, of temperature and of constipation can be found. In the most critical cases, the dead-rate of the little pigs may considerably increase.

Regarding fish breeding basins, stray current may cause luxation of the vertebral column of the fish and will greatly stress the fish to cause repeated furunculosis epidemic.

OBJECT OF THE INVENTION

An object of the present invention is therefore to neutralize stray current that can flow through the body of an animal(s) bred or kept in a farm building.

SUMMARY OF THE INVENTION

More specifically, in accordance with the present invention, there is provided a device for neutralizing alternating stray current flowing through a ground return circuit in the proximity of an animal susceptible to be affected by the stray current, comprising:

means for sensing the alternating stray current flowing through the ground return circuit;

means for producing a signal representative of the sensed stray current; means for generating, in response to the current representative signal, an alternating compensatory current having an amplitude substantially equal to the amplitude of the sensed stray current and being out of phase with respect to the stray current by an angle substantially equal to 180°; and means for injecting the alternating compensatory current in the ground return circuit.

As the stray current and the compensatory current are flowing in the same circuit, they add together and substantially cancel each other. The stray current is then substantially cancelled and can no longer affect the animal.

The present invention also relates to a method for neutralizing alternating stray current flowing through a ground return circuit in the proximity of an animal susceptible to be affected by this stray current, comprising the steps of:

sensing the alternating stray current flowing through the ground return circuit;

producing a signal representative of the sensed stray current;

generating, in response to the current representative signal, an alternating compensatory current having an amplitude substantially equal to the amplitude of the sensed stray current and being out of phase with respect to the stray current by an angle substantially equal to 180°; and injecting the alternating compensatory current in the ground return circuit whereby the stray current and the compensatory current add together and substantially cancel each other.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 2a is a schematic diagram illustrating a first method of connecting a stray current neutralizing device in accordance with the present invention with the electric installation of a farm building;

FIG. 2b is a schematic diagram illustrating a second method of connecting a stray current neutralizing device in accordance with the present invention with the electric installation of a farm building;

FIG. 2c is a schematic diagram illustrating a third method of connecting a stray current neutralizing device in accordance with the present invention with the electric installation of a farm building;

FIG. 2d is a schematic diagram illustrating a fourth method of connecting a stray current neutralizing device in accordance with the present invention with the electric installation of a farm building;

FIG. 3 is a block diagram of the electronic circuit of a stray current neutralizing device in accordance with the present invention.

DETAILED DESCRIPTION OF THE PREFERRED EMBODIMENTS

Figure 1:
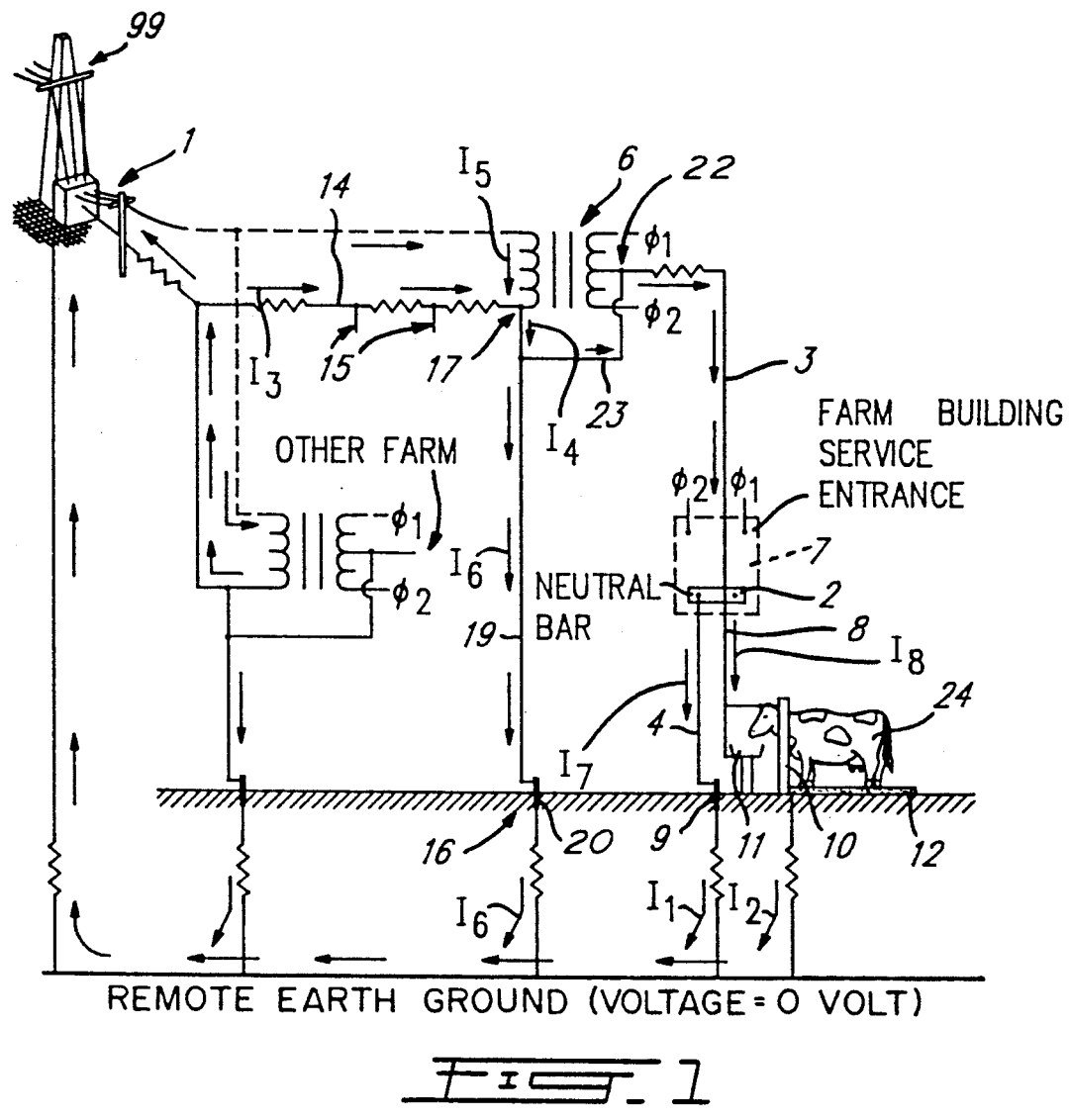
FIG. 1 is a schematic diagram illustrating the origin of stray current in a medium-voltage distribution network.

In the different figures of the appended drawings, the corresponding elements are identified by the same reference numerals.

The origin of stray currents susceptible to flow through the body of an animal kept in a farm building will be first described.

A tingle voltage is a potential difference existing between two points susceptible to be contacted simultaneously by an animal to cause a flow of current through the animal's body. A tingle voltage can also be defined as a potential difference between two points caused by a flow of current through the body of an animal.

A tingle voltage can produce a flow of current both (a) through the body of the animal from the concrete floor toward metallic structures contacted by the animal (touch voltage circuit), and (b) through the animal's body from one paw to the other (step voltage circuit).

In a farm, unbalance of the charges supplied by the respective phases of the utility's network 1 (FIG. 1) causes a high flow of alternating current in the neutral conductor 14 electrically interconnecting the secondary neutral 22 of the farm transformer 6 and the neutral bar 2 of the service entrance 7 of the farm building. This produces a neutral earth voltage on the network of neutral and grounding conductors such as 3, 4 and 8, these conductors being interconnected through the neutral bar 2 of the service entrance 7. As shown in FIG. 1, the grounding conductor 4 interconnects the neutral bar 2 and a ground rod 9, while the grounding conductor 8 connects the neutral bar 2 with metallic structures such as stalls 10 and drinking troughs 11 themselves electrically connected to the concrete floor 12 on which animals such as cows 13 stand. As these metallic structures such as 10 and 11 are connected to the neutral bar 2 through grounding conductor 8, the neutral earth voltage also appears on these structures. As can be appreciated by one skilled in the art, this neutral earth voltage will generate alternating ground currents $I_1$ and $I_2$ shown in FIG. 1.

Moreover, in North America, the structure of the electric distribution networks such as 1 causes the flow of a small portion of the primary supply alternating current toward the ground, and this current tends to return to its source (substation 99) through the earth.

As shown in FIG. 1, the current $I_3$ flowing through the primary neutral conductor 14 of the utility's medium-voltage network 1 creates a voltage drop in that conductor 14. A portion $I_4$ of the primary current $I_5$ flowing through the primary winding of the farm transformer 6 therefore tends to return to the substation 99 through the earth. As the grounding connections such as 15 and 16 of the primary neutral conductor 14 have a certain resistance, a potential with respect to the earth ground (0 volt) appears on the primary neutral 17 of transformer 6.

The Ohm's law predicts this behavior of a medium-voltage network; the potential on the primary neutral 17 cannot be equal to 0 if the resistance of the primary neutral conductor 14 is not equal to 0 or if the resistance of the grounding connections such as 15 and 16 is not equal to 0. As the two latter conditions cannot be reached, it is impossible to cancel the voltage on the primary neutral 17. The intensity $I_6$ of the current flowing in the grounding conductor 19 and the ground rod 20 is of course function of the potential of the primary neutral 17 and the resistance of the ground connection 16. The same applies for the other ground connections such as 15.

The potential on the primary neutral 17 is transmitted to the secondary neutral 22 of the farm transformer as these two neutrals are interconnected at the transformer 6 through a conductor 23. The voltage on the primary neutral 17 therefore causes a flow of current $I_7$ through the conductor 23, the neutral conductor 3, the neutral bar 2, the grounding conductor 4 and the ground rod 9, this current $I_7$ increasing the amplitude of the ground current $I_1$. The voltage on the primary neutral also causes a flow of current $I_8$ in the circuit formed by the conductor 23, the neutral conductor 3, the grounding conductor 8, and the metallic structures such as the stalls 10 and the drinking troughs 11, the current $I_8$ raising the value of the ground current $I_2$.

As can be appreciated by one skilled in the art, bypass currents such as $I_1$, $I_2$ and $I_6$ add and flow in the soil toward the substation 99. Due to the complex nature of the soil, the distribution of the current at the surface of the ground is not uniform. This stray current, flowing through the soil, tends to raise toward the primary neutral of the utility and is therefore attracted by the high humidity level and the alkaline nature of the concrete floor 12 of the farm building.

Attracted by the concrete floor 12 and the manure pit, if present, of the farm building, the stray current will flow through the body of the cow 24 or other animal (touch or step circuit) to reach the metallic structures (stalls 10, drinking troughs 11, manure remover (not shown), etc.), and then will flow toward the grounding and neutral conductors (see for example 3 and 8 in FIG. 1).

An electric service entrance 7 for a farm building usually comprises, as illustrated for example in FIG. 2a, a saturable reactor (or saturable filter) 18 installed on the distribution board of that service entrance 7, between the neutral bar 2 and the grounding network of the farm building.

As well known in the art, the saturable reactor 18 is a static, magnetic-core reactor, similar to a transformer but having a variable impedance. More specifically, the saturable reactor will present, under normal conditions, a high resistance to current flow of low intensity from the neutral bar 2 to the grounding network (including for example grounding conductor 4, ground rod 9, grounding conductor 25, and metallic structures such as the stalls 10 and the drinking troughs 11, etc.) to thereby limit such current. However, under overload (overvoltage) conditions, the resistance of the reactor 18 will decrease to a very low value, to enable flowing of high current.

The reactor 18 will prevent tingle voltages from the other buildings of the same farm and of neighbour farms to enter in the grounding network of the farm building of concern. Therefore, this reactor 18 will not eliminate the tingle voltage but will prevent it to affect the animal(s).

It should be pointed out here that the saturable reactor 18 will however enable low intensity alternating current to flow from ground bar 4 to the neutral bar 2.

Five methods for reading the stray current and for injecting the alternating compensatory current are available. The choice of any of these five methods will depend on the structure of the electric installation of the farm building.

First method (FIG. 2a)

In a cowshed in which the cows are continuously attached to the metallic structures (stalls), an insulated copper conductor (#6 AWG) 25, is used to interconnect all the metallic structures (stalls 10, drinking troughs 11, etc.). Upon installation of this insulated copper conductor, it is important to create no internal loops between the different metallic structures.

Inventor's researches demonstrate that the level of stray current increases with the number of cows attached to the metallic stalls 11.

One end 25' of the insulated copper conductor 25 is connected to one terminal 18' of the saturable reactor 18, to thereby establish a ground return circuit (soil, concrete floor 12, animal(s), metallic structures, conductor 25, saturable reactor 18, neutral conductor 3, etc.) conducting the alternating stray current flowing through the cows or other animals toward and through this reactor 18.

A current transformer 100 (FIG. 3) will sense the alternating stray current at point 26, and an alternating compensatory current having the same amplitude as the sensed stray current, but being out of phase by an angle of 180° with respect to the latter current will be injected in the ground return circuit at point 27, situated between point 26 and the reactor's terminal 18'. The stray current flowing through the reactor 18 will then be, if not cancelled, reduced to the order of the milliampere.

This method will eliminate any touch current circuit, i.e. any circuit in which a current flows through the body of an animal from the concrete floor to the metallic structures.

Second method (FIG. 2b)

In a farm building in which the animals are free to move into an enclosure but susceptible to touch metallic structures such as drinking troughs 11 although not continuously in contact therewith, an insulated copper conductor (#6 AWG) 28 interconnects all theses metallic structures. It is however important that the conductor 28 creates no internal loops in the different metallic structures. The conductor 28 will establish a ground return circuit (soil, concrete floor 12, metallic structures, grounding conductor 28, saturable reactor 18, neutral conductor 3, etc.) for the stray current.

A tinned conductor 29 is buried under the surface of the ground at a deepness varying between 6 and 12 inches. This conductor 29 is associated with a grounding rod (not shown) in view of establishing a very low impedance network. The conductor 29 completely encircles the concrete floor 12 of the farm building, and is interrupted at only one point 30.

The current transformer 100 is mounted at point 31, that is at the terminal 18' of the saturable reactor 18, and the alternating compensatory current is injected at one end 32 of the tinned conductor 29, close to point 30. The compensatory current injected in the ground return circuit through the conductor 29 at point 32 will substantially cancel the stray current reaching the concrete floor 12 of the farm building and susceptible to flow through the animal(s).

In this case, any step current circuit allowing current to flow through the body of the animal(s) from one paw to the other are eliminated.

Third method (FIG. 2c):

In the proximity of a very high voltage electric line, a high potential gradient is created into the farm building. To overcome this problem, the following procedure can be followed:

(a) an insulated copper conductor (#6 AWG) 33 is used to interconnect all the metallic structures such as the drinking troughs 11 in the farm building;

(b) the conductor 33 is mounted to avoid the creation of internal loops in the metallic structures;

(c) the conductor 33 has one end 33' connected to the terminal 18' of the saturable reactor 18 to establish a ground return circuit (soil, concrete floor 12, metallic structures, grounding conductor 33, conductor 29, saturable reactor 18, neutral conductor 3, etc.) for the stray current;

(d) the tinned copper conductor 29 is buried under the ground surface at a deepness between 6 and 12 inches and is associated with a ground rod (not shown) in view of establishing a very low impedance network. The conductor 29 encircles completely the concrete floor 12 of the farm building, and is interrupted at point 30.

(e) the end 32 of the conductor 29 is connected to the terminal 18' of the saturable reactor 18; and (f) the current transformer 100 is mounted at point 34 on the terminal 18' of the saturable reactor 18, and the compensatory current is injected in the ground return circuit at point 35, adjacent point 34 on the side opposite to the reactor 18.

In this case, the problem overcome is the step current circuit allowing current to flow through the body of the animal from one paw to the other.

Fourth method (FIG. 2d)

In the case of a basin used for breeding fish the following installation is adequate:

the grounding conductor 4 connects directly the neutral bar 2 to the ground electrode 9;

a conductor 36 interconnects the neutral bar 2 and the terminal 18" of the saturable reactor 18;

a tinned copper conductor 37 encircles the fish breeding basin 38, the conductor 37 being lowered in the water or soil encircling the basin 38. The conductor 37 is interrupted at point 39;

one end 40 of the conductor 37 is connected to the terminal 18' of the saturable reactor 18 to establish a ground return circuit (soil or water, conductor 37, saturable reactor 18, grounding conductor 36, neutral conductor 3, etc.) for the stray current; and the current transformer 100 is mounted at point 41 on the terminal 18' between the saturable reactor 18 and the conductor 37, and the compensatory current is injected in the ground return circuit at point 42, adjacent point 41 and situated between point 41 and the saturable reactor 18.

Figure 2E:
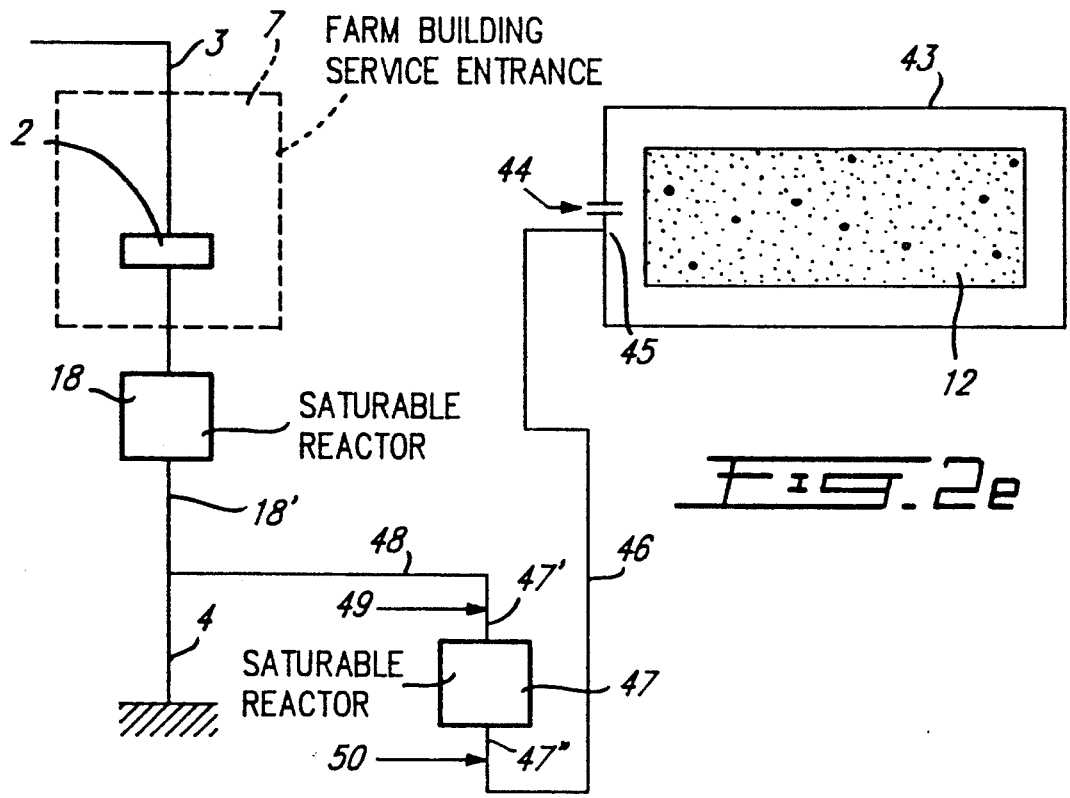
FIG. 2e is a schematic diagram illustrating a fifth method of connecting a stray current neutralizing device in accordance with the present invention with the electric installation of a farm building.

Fifth method (FIG. 2e)

In the case of a farm building in which the animals are free to move into an enclosure but susceptible to touch metallic structures such as drinking troughs 5 although not continuously in contact therewith, the following installation can be used:

(a) a tinned copper conductor 43 is buried under the ground surface at a deepness between 6 and 12 inches and is associated with a ground rod (not shown) in view of establishing a very low impedance network. The conductor 43 encircles completely the concrete floor 12 of the farm building, and is interrupted at point 44.

(b) one end 45 of the conductor 43 is connected to the terminal 18' of the saturable reactor 18 through a grounding conductor 46, another saturable reactor 47 and another grounding conductor 48 to establish a ground return circuit (soil, conductor 43, grounding conductor 46, saturable reactor 47, grounding conductor 48, saturable reactor 18, neutral conductor 3, etc.) for the stray current; and (c) the current transformer 100 is mounted at point 49 on the terminal 47' of the saturable reactor 47, and the compensatory current is injected in the ground return circuit at point 50 on the terminal 47" of the reactor 47.

The installation of FIG. 2e will eliminate any step current circuit.

FIG. 3 is a block diagram of the electronic circuit of the stray current neutralizing device in accordance with the present invention.

As mentioned in the foregoing description, the alternating stray current is sensed through a current transformer 100 situated at one of the positions illustrated in FIGS. 2a–2d. In the case of FIGS. 2a and 2b, the use of a current transformer 100 is essential as, in accordance with the Canadian Code of Electricity, rupture of a grounding conductor to insert a current measuring equipment is forbidden.

An alternating current representative signal 101 is produced at the secondary terminals of the current transformer 100 and applied to the input of a signal converter 102. This converter 102 includes a differential amplifier 103, having a voltage gain of 33, for amplifying the current representative signal 101. The amplified signal 104 at the output of the amplifier 103 is then filtered through a 1st-order low-pass filter 105 having a transition frequency of 360 Hz. The signal at the output of the filter 105 is then preamplified (130) with a gain of 10. An alternating current measurement signal 106 is obtained at the output of the preamplifier 130, which is also the output of the converter 102.

The current measurement signal 106 is received and amplified by a proportional controller 107. The function of the controller 107 is to adjust t he overall gain of the amplification chain including the converter 102, the proportional controller 107, gain controller 108 and power amplifier 109, so that the overall gain of this chain can be adjusted to inject an alternating compensatory current having an amplitude equal to that of the stray current sensed through the transformer 100. The proportional controller 107 has a set point equal to "0" and a gain manually adjustable from 0 to 20 by means of a DIP switch and many potentiometers. This is the only adjustment susceptible to be carried out upon installation of the stray current neutralizing device.

The alternating output signal 110 from the proportional controller 107 is supplied to the power amplifier 109 through a gain controller 108. Depending on the output signal 112 from a disturbance detector 111, the gain controller will transmit or not the signal 110 to the power amplifier 109. The gain controller 108 may be constructed from an analog multiplier having a first input receiving the signal 110 from the proportional controller 107 and a second input on which signal 112 is applied.

The disturbance detector 111 comprises a first low-pass filter 114 having a transition frequency of 50 kHz, and a second high-pass filter 114' having a transition frequency of 3.8 kHz. Accordingly, the detector 111 will detect only disturbances produced by the power amplifier 109 and having a frequency situated between 3.5 and 50 kHz. The output of filter 114' is amplified (115) whereby disturbances of small amplitude can be detected, and rectified (116) to provide a DC signal 112 representative of the disturbance and compatible with the analog multiplier of the gain controller 108.

When the stray current flowing through the ground return circuit is very low, high frequency low-amplitude disturbances of short duration can be produced for example by the power amplifier 109. The detector 111 filters (114 and 114'), amplifies (115) and rectifies (116) such disturbances to produce a DC signal 112 having an amplitude suitable to control the controller 108 so as to prevent the signal 110 to be applied to the input 117 of the power amplifier 109 during these disturbances.

The power amplifier 109 amplifies the alternating output signal 117 from the gain controller 108. The gain of amplifier 109 is negative and equal to 31 whereby the current injected in the ground return circuit 113 is out of phase by an angle of 180° with respect to the stray current sensed by the current transformer 100. As indicated in the foregoing description, the overall gain of the amplification chain 102, 107, 108 and 109 is adjusted through the proportional controller so that the amplitude of the current injected by the power amplifier 109 has the same amplitude.

As the compensatory current injected in the ground return circuit 113 by the power amplifier 109 has the same amplitude as the sensed stray current, but is out of phase by an angle of 180° with respect to that stray current, theses stray and compensatory currents will add and cancel each other in the ground return circuit. The stray current will then, in not completely neutralized, substantially reduced in amplitude (amplitude of the order of the milliampere).

The above values given for the gain of the amplifier 103, the proportional controller 107, the gain controller 108 and the power amplifier 109 are only examples. These values must of course be selected in function of the ratio of the amplitude of the signal 101 on the secondary terminals of the current transformer 100, to the amplitude of the stray current sensed by this transformer.

Figure 4:
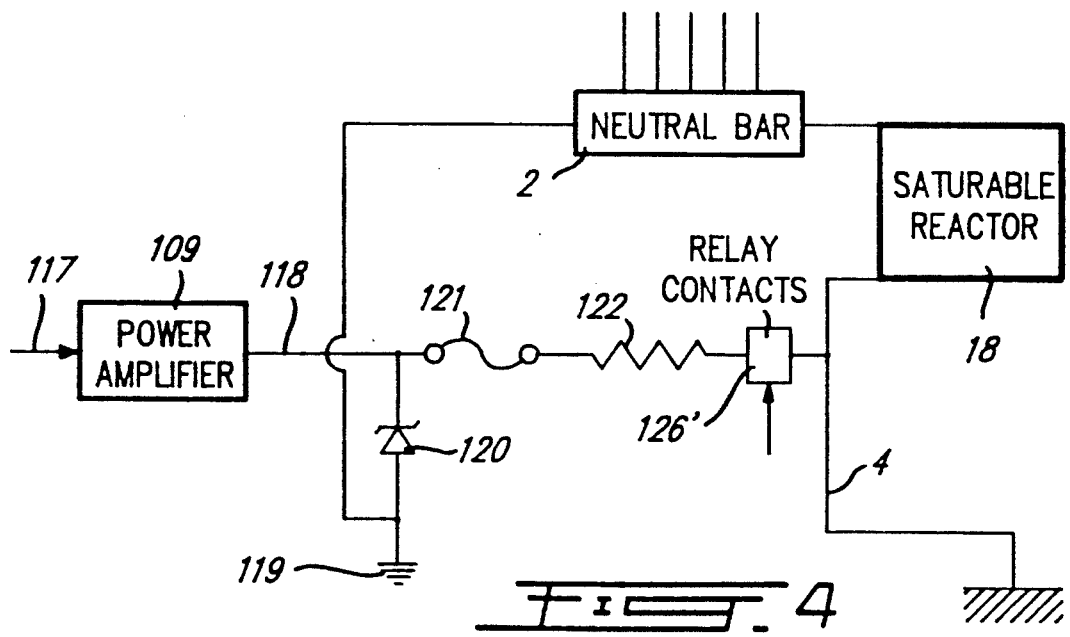
FIG. 4 shows the output connections of the electronic circuit of FIG. 3 to the electric installation of the farm building.

As illustrated in FIG. 4, a bipolar Zener diode (transient) 120 has its cathode connected to the output 118 of the power amplifier 109 and its anode connected to the ground 119 of the electronic circuit (ground of the power supply (not shown)). This ground 119 is itself connected to the neutral bar 2. The bipolar Zener diode 120 will cause a high current to flow through the fuse 121 when the amplitude of the voltage at the output 118 of the amplifier 109 becomes higher than a nominal value (22 volts). The power amplifier 109 is thereby protected against overvoltages.

A fused 121 and a resistor 122 (FIG. 4) are connected in series between the output 118 of the power amplifier 109 and the ground return circuit. The resistor 122 will damp oscillations at very low frequencies (1 to 4 Hz). The fuse 121 is a fuse that melts slowly in response to an overcurrent condition. It will protect the stray current neutralizing device upon a short-circuit occurring on the grounding conductor such as 4. It will also limit the intensity of the output current from the power amplifier 109.

A trigger circuit 123 (FIG. 3) converts the current measurement signal 106 from output of the converter 102 into a DC signal and compares this DC signal to a DC voltage reference 124. The reference 124 is adjusted to represent a maximum current on the output 118 of the power amplifier. When the amplitude of the DC signal produced by the trigger circuit 123 is higher than the voltage reference 124, a triggering signal 125 is transmitted to a relay through a delay circuit 127 and a latch circuit 128.

The delay circuit 127 will delay transmission of any triggering signal 125 during a time period of 1 sec to prevent triggering of the relay upon occurrence of a signal 125 of short duration.

The latch circuit will store the triggering signal 125 until a reset switch 129 is operated.

The contacts 126' of the relay 126 are normally open contacts mounted between the output 118 of the power amplifier 109 and the ground return circuit 113. The coil (not shown) of the relay 126 is normally energized to close the normally open contacts 126' and connect the output 118 to the circuit 113. In response to a triggering signal 125, the coil of the relay 126 is deenergized to open these contacts; this condition persists until the reset switch 129 is depressed or otherwise operated as described above.

Accordingly, upon a power failure, the coil of the relay 126 will be deenergized to open the normally open contacts 126' and disconnect the output 118 of the power amplifier 109 from the ground return circuit.

Although the present invention has been described hereinabove by way of preferred embodiments thereof, these embodiments can be modified at will, within the scope of the appended claims, without departing from the spirit and nature of the present invention.

The embodiments of the invention in which an exclusive property and privilege is claimed are defined as follows:

1. A device for neutralizing alternating stray current flowing through a ground return circuit in the proximity of an animal susceptible to be affected by said stray current, comprising:
   means for sensing said alternating stray current flowing through the ground return circuit;
   means for producing a signal representative of said sensed stray current;
   means for generating, in response to said current representative signal, an alternating compensatory current having an amplitude substantially equal to the amplitude of the sensed stray current and being out of phase with respect to said stray current by an angle substantially equal to 180°; and
   means for injecting said alternating compensatory current in said ground return circuit whereby said stray current and said compensatory current add together and substantially cancel each other.

2. A stray current neutralizing device according to claim 1, wherein said ground return circuit comprises a conductor, and wherein said current sensing means comprises a current transformer for sensing the alternating stray current flowing through said conductor.

3. A stray current neutralizing device according to claim 1, wherein said current representative signal is an alternating signal, and wherein said current generating means comprises means for amplifying the alternating current representative signal and for changing the phase of said current representative signal to produce said alternating compensatory current.

4. A stray current neutralizing device according to claim 3, in which said current generating means comprises means for adjusting the gain of said amplifying means.

5. A stray current neutralizing device according to claim 3, wherein said phase changing means comprises a power amplifier having a negative gain.

6. A stray current neutralizing device according to claim 3, further comprising:
   a disturbance detector for detecting high frequency current disturbances in said ground return circuit and for producing a signal representative of the amplitude of said disturbances; and
   a gain controller responsive to said disturbance amplitude representative signal for varying the gain of said amplifying means and thereby preventing amplification of said disturbances by said amplifying means.

7. A stray current neutralizing device according to claim 1, comprising means for limiting the intensity of said compensatory current to a given value.

8. A stray current neutralizing device according to claim 7, wherein said intensity limiting means comprises (a) means for producing a signal representative of the intensity of said alternating compensatory current, (b) means for comparing the amplitude of said intensity representative signal with a signal amplitude threshold, and (c) means for disconnecting said current injecting means from the ground return circuit when the amplitude of said intensity representative signal oversteps said signal amplitude threshold.

9. A stray current neutralizing device according to claim 8, further comprising means for delaying for a given period of time disconnection of the current injecting means from the ground return circuit after said intensity representative signal has overstepped the signal amplitude threshold.

10. A stray current neutralizing device according to claim 1, in which:
   said animal is kept in a farm building having an electric service entrance provided with a saturable reactor;
   said saturable reactor comprises a first terminal connected to a neutral conductor of said electric service entrance, and a second terminal;
   said ground return circuit comprises the saturable reactor, and said first and second terminals; and
   said sensing means comprises means for sensing the stray current at said second terminal of the saturable reactor.

11. A stray current neutralizing device according to claim 10, wherein:
   said second terminal of the saturable reactor is grounded to earth;
   said farm building comprises a concrete floor on which said animal stands and metallic structures susceptible to be contacted by said animal and electrically connected to said second terminal; and
   said injecting means comprises means for injecting said compensatory current on said second terminal of the saturable reactor.

12. A stray current neutralizing device according to claim 10, wherein:
   said second terminal of the saturable reactor is grounded to earth;
   said farm building comprises a concrete floor on which said animal stands and metallic structures susceptible to be contacted by said animal and electrically connected to said second terminal;

an electric conductor is buried into the soil and surrounds the concrete floor of the farm building, said electric conductor comprising two adjacent ends not contacting each other; and said injecting means comprises means for injecting said compensatory current on one of said ends of the electric conductor surrounding said concrete floor.

13. A stray current neutralizing device according to claim 10, wherein:

said second terminal of the saturable reactor is grounded to earth;

said farm building comprises a concrete floor on which said animal stands and metallic structures susceptible to be contacted by said animal and electrically connected to said second terminal;

an electric conductor is buried into the soil and surrounds the concrete floor of the farm building, said electric conductor comprising two adjacent ends not contacting each other;

one of said two ends of the electric conductor buried into the soil around said concrete floor is connected to said second terminal; and said injecting means comprises means for injecting said compensatory current on said second terminal of said saturable reactor.

14. A stray current neutralizing device according to claim 1, wherein:

said animal is kept in a farm building having a concrete floor on which said animal stands, and having an electric service entrance provided with a first saturable reactor;

said first saturable reactor comprises a first terminal connected to a neutral conductor of said electric service entrance, and a second terminal;

said ground return circuit comprises the first saturable reactor, and the first and second terminals of said first saturable reactor;

said second terminal of the first saturable reactor is grounded to earth;

said neutralizing device comprises a second saturable reactor having a first terminal connected to the second terminal of the first saturable reactor, and a second terminal;

an electric conductor is buried into the soil and surrounds the concrete floor of the farm building, said electric conductor comprising two adjacent ends not contacting each other;

one of said two ends of the electric conductor buried into the soil around said concrete floor is connected to said second terminal of the second saturable reactor;

said sensing means comprises means for sensing the stray current at said first terminal of the second saturable reactor; and said injecting means comprises means for injecting said compensatory current on said second terminal of the second saturable reactor.

15. A stray current neutralizing device according to claim 1, in which:

said animal is a fish kept into a basin of a fish breeding farm having an electric service entrance provided with a saturable reactor;

said saturable reactor comprises a first terminal connected to a neutral conductor of said electric service entrance, and a second terminal;

said ground return circuit comprises the saturable reactor, and the first and second terminals of said saturable reactor;

said neutral conductor of the electric service entrance is grounded to earth;

an electric conductor surrounds the basin and comprises two adjacent ends not contacting each other;

one of said two ends of the electric conductor surrounding the basin is connected to said second terminal of the saturable reactor;

said sensing means comprises means for sensing the stray current at said second terminal of the saturable reactor; and said injecting means comprises means for injecting the compensatory current on said second terminal of the saturable reactor.

16. A stray current neutralizing device according to claim 1, in which:

said animal is kept in a farm building having an electric service entrance provided with a saturable reactor;

said saturable reactor comprises a first terminal connected to a neutral conductor of said electric service entrance, and a second terminal connected to an grounding network;

said ground return circuit comprises the first saturable reactor, and said first and second terminals; and said current generating means comprises an electronic power amplifier having a ground connected to said first terminal of the saturable reactor and an output connected to said second terminal of the saturable reactor, said ground and output of the power amplifier being interconnected through a bipolar Zener diode to limit the amplitude of the voltage on the output of the power amplifier.

17. A method for neutralizing alternating stray current flowing through a ground return circuit in the proximity of an animal susceptible to be affected by said stray current, comprising the steps of:

sensing said alternating stray current flowing through the ground return circuit;

producing a signal representative of said sensed stray current;

generating, in response to said current representative signal, an alternating compensatory current having an amplitude substantially equal to the amplitude of the sensed stray current and being out of phase with respect to said stray current by an angle substantially equal to 180°; and injecting said alternating compensatory current in said ground return circuit whereby said stray current and said compensatory current add together and substantially cancel each other.

18. A stray current neutralizing method according to claim 17, wherein said current representative signal is an alternating signal, and wherein said current generating step comprises amplifying the alternating current representative signal and changing the phase of said current representative signal to produce said alternating compensatory current.

19. A stray current neutralizing method according to claim 17, further comprising the step of limiting the intensity of said compensatory current to a given value.

* * * * *